United States Patent
Ukita et al.

(10) Patent No.: US 7,277,081 B2
(45) Date of Patent: Oct. 2, 2007

(54) INFORMATION PROCESSING APPARATUS

(75) Inventors: Yoshitaka Ukita, Tokyo (JP); Keisuke Hashimoto, Kanagawa (JP)

(73) Assignee: Sony Corporation (JP)

( * ) Notice: Subject to any disclaimer, the term of this patent is extended or adjusted under 35 U.S.C. 154(b) by 257 days.

(21) Appl. No.: 10/281,979

(22) Filed: Oct. 29, 2002

(65) Prior Publication Data
US 2003/0095110 A1 May 22, 2003

(30) Foreign Application Priority Data
Oct. 30, 2001 (JP) ............................. P2001-332391

(51) Int. Cl.
G09G 5/00 (2006.01)
(52) U.S. Cl. ........................................ 345/156; 345/168
(58) Field of Classification Search ................ 345/156, 345/173, 168, 169
See application file for complete search history.

(56) References Cited

U.S. PATENT DOCUMENTS

| | | | | |
|---|---|---|---|---|
| 5,584,054 | A * | 12/1996 | Tyneski et al. | 455/566 |
| 6,215,464 | B1 * | 4/2001 | Jensen | 345/84 |
| 6,317,313 | B1 * | 11/2001 | Mosgrove et al. | 361/680 |
| 6,483,697 | B1 * | 11/2002 | Jenks et al. | 361/683 |
| 6,492,978 | B1 * | 12/2002 | Selig et al. | 345/173 |
| 6,636,203 | B1 * | 10/2003 | Wong et al. | 345/173 |
| 6,667,738 | B2 * | 12/2003 | Murphy | 345/173 |
| 6,785,562 | B2 * | 8/2004 | Lee et al. | 455/566 |
| 2002/0086702 | A1 * | 7/2002 | Lai et al. | 455/556 |

FOREIGN PATENT DOCUMENTS

JP 09-258896 10/1997
JP 10-091305 4/1998

OTHER PUBLICATIONS

"Official Gadgeteer Hands on Review: Lodis Zip-Around Wallet, Mobile Organizer and Phone Carrier"; Judie Clark; May 14, 2001; "http://www.the-gadgeteer.com/review/lodis_zip_around_wallet_mobile_organizer_and_phone_carrier_case".*
Office Action dated, Apr. 18, 2007.

* cited by examiner

Primary Examiner—Amr A. Awad
Assistant Examiner—Steven E Holton
(74) Attorney, Agent, or Firm—Rader Fishman & Grauer PLLC; Ronald P. Kananen

(57) ABSTRACT

In a personal data assistant, a main body includes an input sheet, which is turnable between a first position where at least a part of a display unit of the personal data assistant is covered and a second position where the display unit is not covered. The input sheet has various types of keys formed thereon. When any one of the keys is pressed on the input sheet, a pressure is applied to an input device formed on the display unit, and an input coordinate is detected by the change of, for example, the resistance value of the input device. Since the surface of the display unit is not entirely covered with the input sheet, the display in the range of the display unit which is not covered with the input sheet is not made dark. Further, since the input device is not directly touched with a finger, the input device is prevented from being made dirty, and the display of the display unit under the input device is prevented from being difficult to be seen. Accordingly, the operability of the personal data assistant can be improved while displaying information clearly.

22 Claims, 24 Drawing Sheets

INFORMATION PROCESSING APPARATUS

BACKGROUND OF THE INVENTION

1. Field of the Invention

The present invention relates to an information processing apparatus, and, more particularly, to an information processing apparatus having improved operability.

2. Description of the Related Art

Recently, personal digital assistants (hereinafter, abbreviated as "PDA") have become widely used.

FIG. 1 shows an example of an arrangement of a conventional PDA.

A display unit 2 composed of a liquid crystal is disposed on the front surface of a main body 1 of the PDA, and a touch panel 3 is formed on the display unit 2.

Character/gesture input areas 4 are areas in which input ranges are printed from the back surface thereof in the lower portion of the touch panel 3, and a display area 5 is a display area of a software key board displayed on the display unit 2, and various types of instructions can be input therethrough, respectively.

Further, the main body 1 includes a schedule display button 6 operated when a schedule is displayed, an address display button 7 operated when an address is displayed, an up/down button 8 operated when information is scrolled at the time a cursor is moved in a display screen, a button 9 operated when a "to do list" is displayed, and a memorandum note display button 10 operated when a memorandum note is displayed in order to display the above information by switching the internal mechanism thereof.

An input pen 11 is used to input a character on the touch panel 3, to select a menu in the display screen, and to input a gesture in the character/gesture input area 4.

FIGS. 2A to 2C show another example of the PDA. Note that, in FIGS. 2A to 2C, the portions corresponding to those of the example shown in FIG. 1 are denoted by the same reference numerals. In this example, a keyboard block 21 can be drawn from a main body 1. FIG. 2A shows a state in which the keyboard block 21 is accommodated in the main body. The keyboard block 21 is drawn in the lower direction of the main body, 1 as necessary, as shown in FIG. 2B or 2C. Various instructions can be input through keys 22 disposed on the upper surface of the keyboard block 21.

Incidentally, the example shown in FIG. 1 must be provided with the input pen 11 in order to input data using the transparent touch panel 3 fixed on the display unit 2 without making the surface of the touch panel 3 dirty, from which a problem has arisen in that the operation is complicated.

Further, there is a problem in that when a user directly operates the touch panel 3 with a finger repeatedly, the screen of the touch panel 3 becomes dirty and it is difficult to see a display on the display unit 2 located under the touch panel 3.

Since the touch panel 3 is transparent, an increase in the thickness thereof deteriorates the quality of the display screen of the display unit 2. When data is input, the feeling of stroke and the feeling of click is insufficient and it is problematic to further increase the thickness of the touch panel 3 as a result.

Further, since the touch panel 3 is disposed to cover the front surface of the display unit 2, a problem has arisen in that the luminance of the display unit 2 is impaired and a displayed image is made dark.

Further, operations such as a software operation for calling the input screen of the software keyboard and the like on the display unit 2 and an operation for pressing a call button must be executed, from which a problem has arisen in that the operations are complicated.

In the apparatus of the example shown in FIGS. 2A to 2C, since the keyboard block 21 must be drawn from the main body 1 when it is used, the operation thereof is complicated. Further, a slide mechanism for drawing the keyboard block 21 must be provided, as well as the keyboard block 21 must be arranged as a block. Accordingly, the slide mechanism cannot help being increased in size to some extent when the durability thereof is taken into consideration. As a result, there is a problem in that the size of the apparatus of the example is increased in its entirety.

SUMMARY OF THE INVENTION

Accordingly, an object of the present invention, which was made in view of the above circumstances, is to provide an information processing apparatus having improved operability in an input operation while displaying information clearly by movably disposing a sheet-shaped member on a display screen.

An information processing apparatus of the present invention is characterized by including a display unit for displaying predetermined information, an operation unit having a sheet-shaped member movable between a first position where at least a part of the display unit is covered and a second position where the display unit is not covered and operated when a predetermined input operation is executed, and an operation detecting unit for detecting an operation applied to the operation unit.

The operation unit may be disposed so as to cover only a part of the lower portion of the display unit at the first position.

The operation detecting unit may be disposed so as to be formed integrally with the operation unit.

The operation unit may be disposed so as to include a resistance film as the operation detecting unit.

The operation detecting unit may be formed integrally with the display unit, and the operation unit may be disposed on the operation detecting unit at the first position.

The information processing apparatus may further include a position detecting unit for detecting that the operation unit is located at the first position and a control unit for controlling the operation unit so that data can be input therefrom when it is determined by the position detecting unit that the operation unit is located at the first position.

When the operation unit is operated at a predetermined position thereof, the position detecting unit may detect that the operation unit is located at the first position.

The position detecting unit may include a switch actuated when the operation unit is disposed at the first position.

When the position detecting unit detects that the operation unit is located at the first position, the control unit may control the display unit so that the information which is necessary for the operation unit to execute the predetermined input is displayed on the display unit.

The operation unit may be turnable between the first position and the second position.

The information processing apparatus may be arranged as a personal data assistant.

The operation unit may be composed of a transparent or semi-transparent member.

The operation unit may be formed of a polymeric material.

Information necessary to input may be displayed on the operation unit by print or engraving.

In the information processing apparatus of the present invention, an operation for executing the predetermined input may be detected by the sheet-shaped member which is movable between the first position where at least a part of information being displayed is covered and the second position where the information is not covered.

DESCRIPTION OF THE PREFERRED EMBODIMENTS

Figure 1:
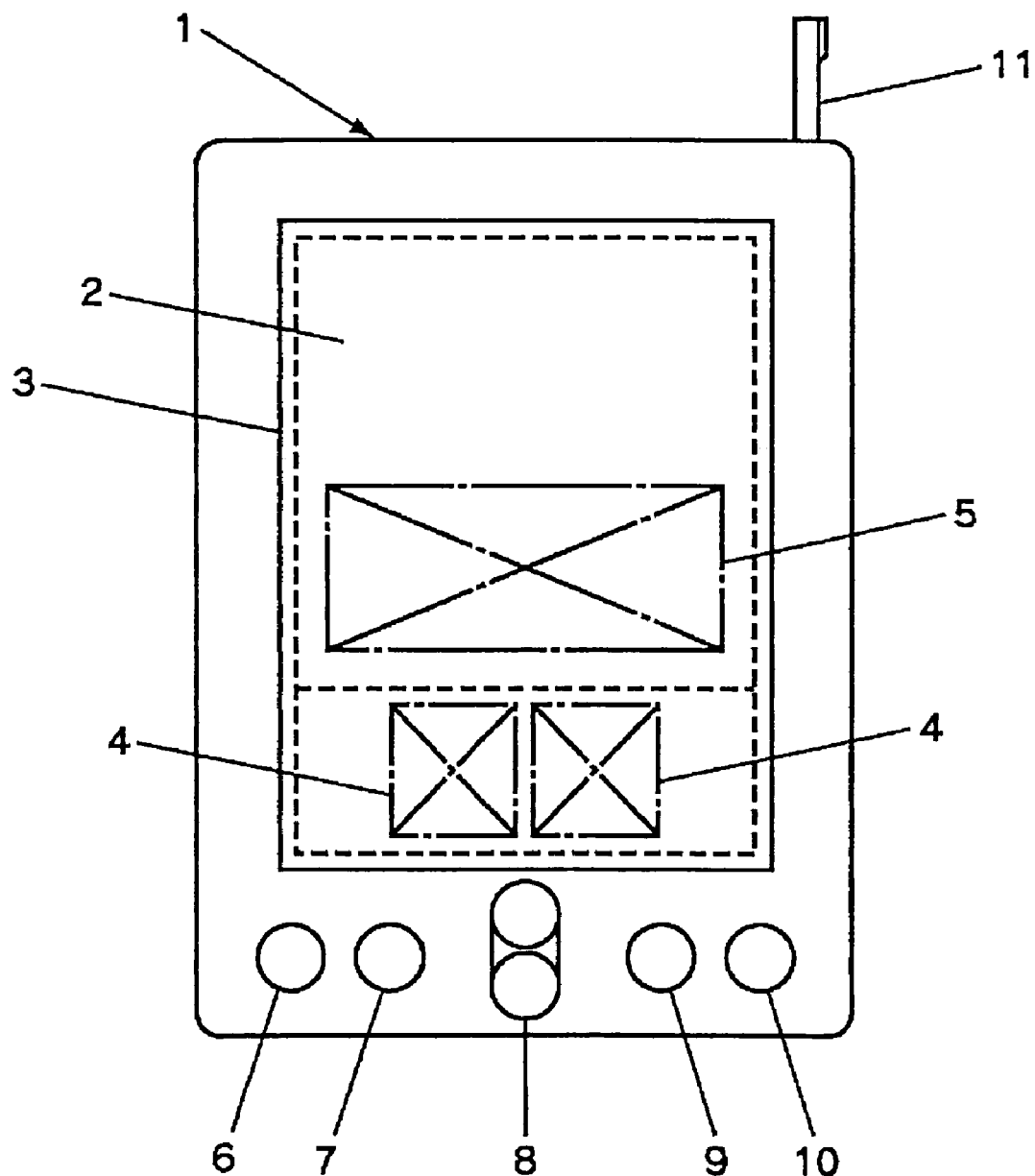
FIG. 1 is a front elevational view showing an arrangement of a conventional PDA.
Figure 2A:
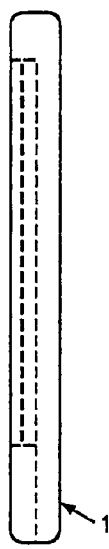
FIGS. 2A to 2C are views showing an arrangement of another conventional PDA.
Figure 2B:
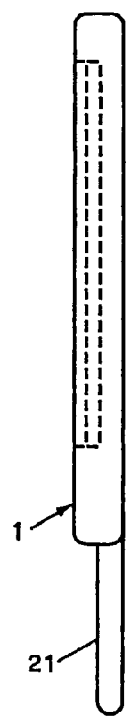
Figure 2C:
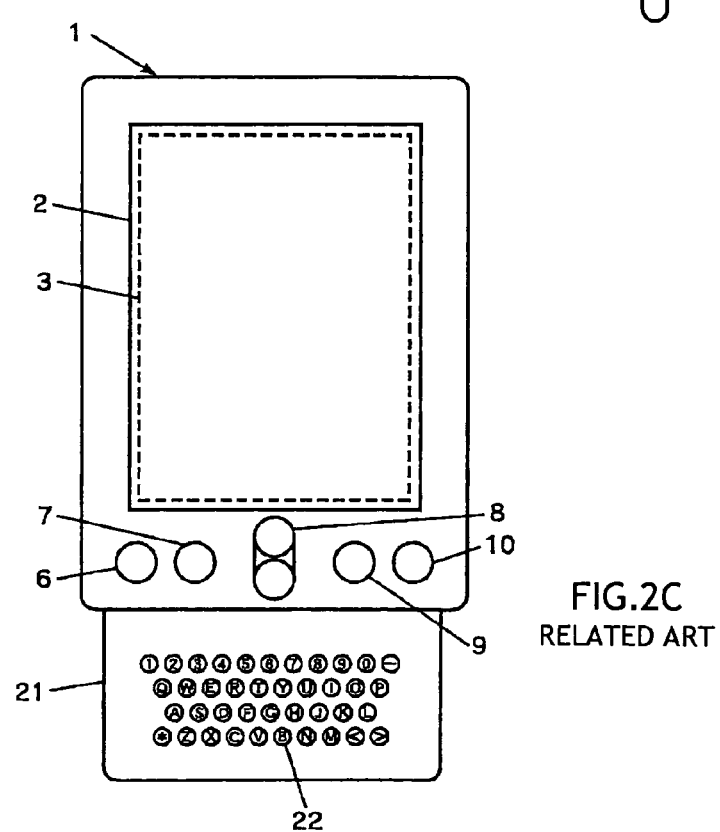
Figure 3:
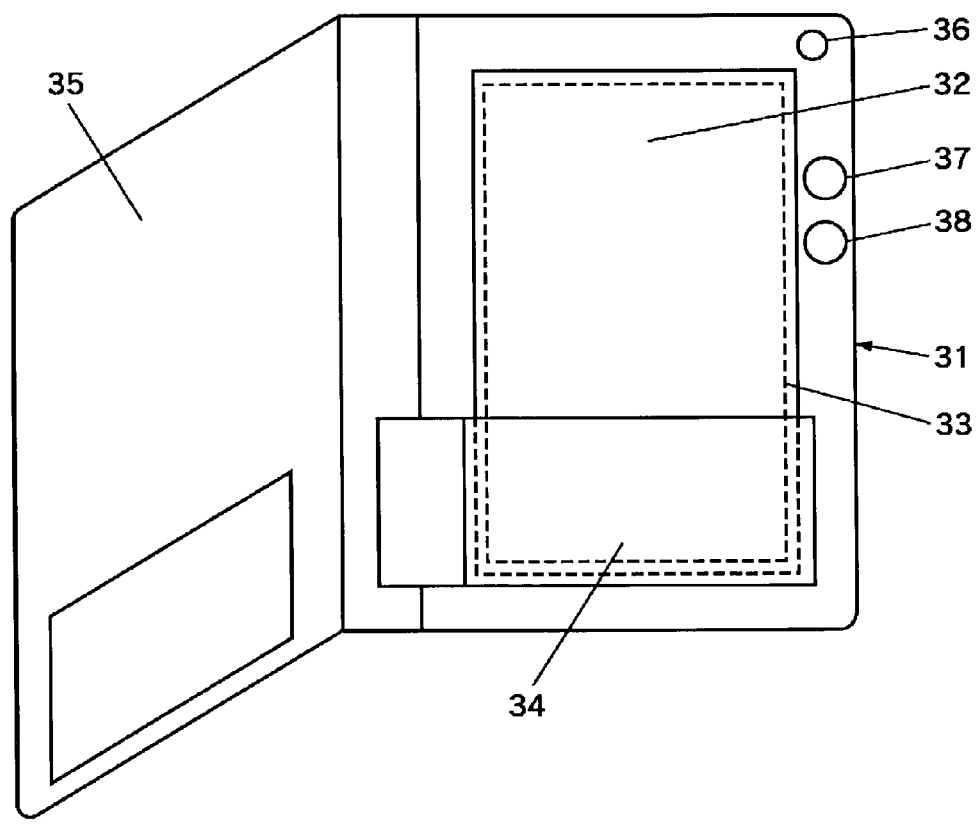
FIG. 3 is a perspective view showing an arrangement of a PDA to which the present invention is applied.

FIG. 3 shows an arrangement of a PDA to which the present invention is applied. The PDA is composed of a main body 31 and a lid member 35 that is disposed turnably with respect to the main body 31 between a position where the main body 31 is entirely covered therewith and a position where the main body 31 is exposed therefrom.

Figure 4A:
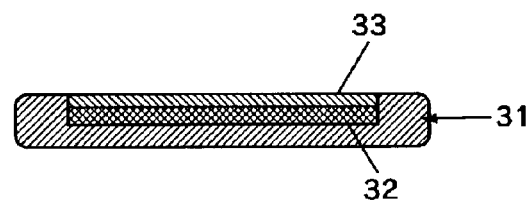
FIGS. 4A and 4B are views showing an arrangement of the PDA to which the present invention is applied.

A display unit 32 of the main body 31 is composed of, for example, a color TFT (thin film transistor) liquid crystal, a black and while STN (super twisted nematic) liquid crystal, a cholesteric liquid crystal, and the like. A back light, which uses, for example, a fluorescent tube, an LED (light emitting diode), or an EL (electroluminescence) device, or a front light using the LED (any of them not shown) is mounted on the display unit 32. As shown in a sectional view of FIG. 4A, an input device 33 composed of a transparent or semi-transparent touch panel having a sufficient light transmittance is arranged on the upper surface of the display unit 32 integrally therewith (in combination therewith). The input device 33 can be composed of, for example, a glass or a plastic film employing a resistance film pressure-sensitive system, an electrostatic induction system, or an electromagnetic induction system.

An input sheet 34 for inputting information is further disposed on the upper surface of the input device 33.

A power button 36, which is operated when a power supply is turned on and off, a scroll button 37, which is operated when a display screen of the display unit 32 is scrolled, and a return button 38, which is operated when the display screen of the display unit 32 is returned, are disposed on the right side of the display unit 32 of the main body 31.

The input sheet 34 is composed of a polymeric material having a relatively low hardness, for example, silicon rubber, elastomer, and the like. Further, the input sheet 34 is transparent or semi-transparent. Thus, a user can easily see information from above the input sheet 34.

Figure 4B:
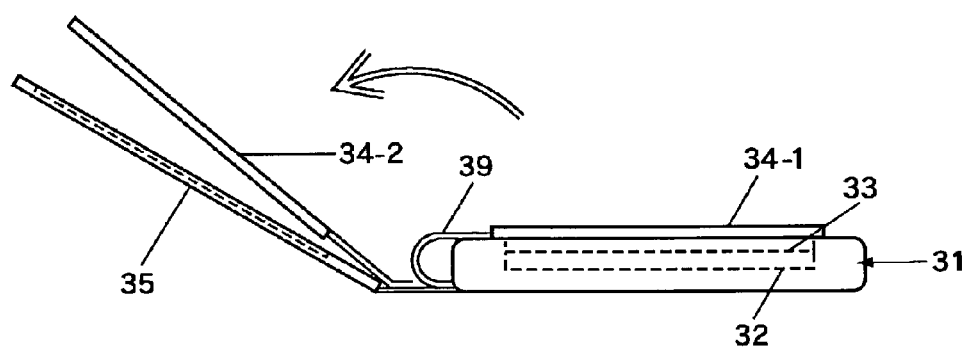

As shown in FIGS. 3 and 4B, the input sheet 34 can be turned between a first position where it comes into contact with the display unit 32 (more exactly, comes into contact with the input device 33) and covers it (position denoted by reference numeral 34-1) and a second position where the input sheet 34 is separated from the display unit 32 (input device 33) and opens it (position denoted by reference numeral 34-2).

For this purpose, a joint 39 between the input sheet 34 and the main body 31 also is composed of a polymeric material having a low hardness, such as silicon rubber, elastomer, and the like. With this arrangement, the input sheet 34 can be moved (turned) from the position 34-1 to the position 34-2 by flexible handling, for example, as if a paper is turned over. The joint 39 may be composed of the same material as that of the input sheet 34 or may be composed of a different material that is not transparent.

Figure 5:
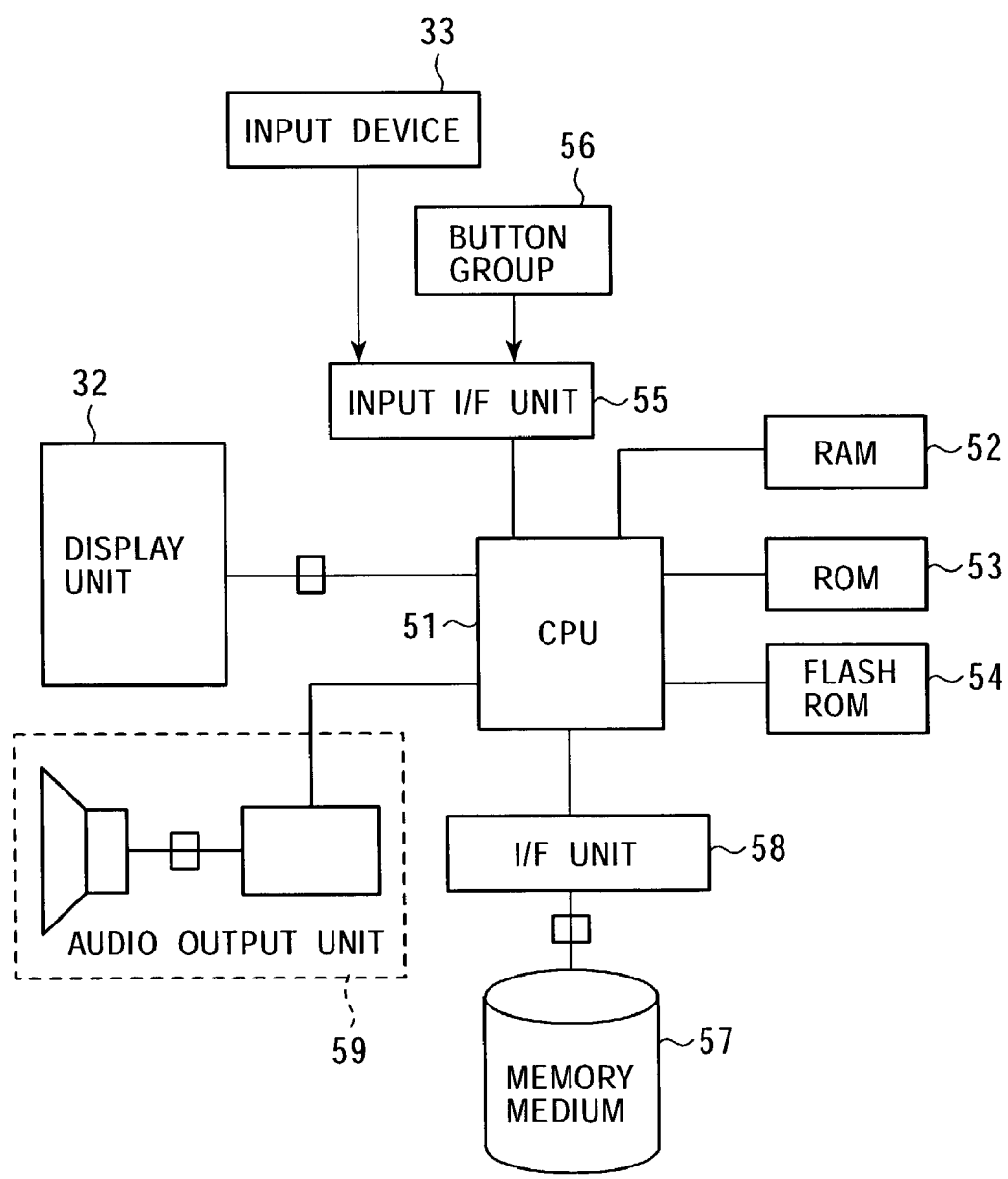
FIG. 5 is a block diagram showing an inside arrangement of the PDA to which the present invention is applied.

FIG. 5 shows an example of an arrangement in the PDA shown in FIG. 3. A CPU (central processing unit) 51 controls the operation of the apparatus in its entirety. A RAM (random access memory) 52 temporarily stores the data from the respective units of the apparatus. A ROM (read only memory) 53 and a flash ROM 54 store basic programs such as an OS (operating system) and the like for executing encryption/decryption processing and controlling the apparatus in its entirety, the key codes of a public key, a secret key, a common key, and the like for encrypting and decrypting contents, ID information for identifying the apparatus, an application for reproducing the contents, and the apparatus information file (ID information, public key, and the like) of apparatuses from and to which contents are supplied.

An input I/F (interface)/55 sends the information input from a button group 56 composed of various buttons 36, 37, 38, and the like or from the input device 33 to the CPU 51. An I/F unit 58 executes interface processing between the CPU 51 and a memory medium 57 to input and output (to read and write) contents (data). An audio output unit 59 reproduces the audio data of the contents in response to an instruction from the CPU 51.

Figure 6A:
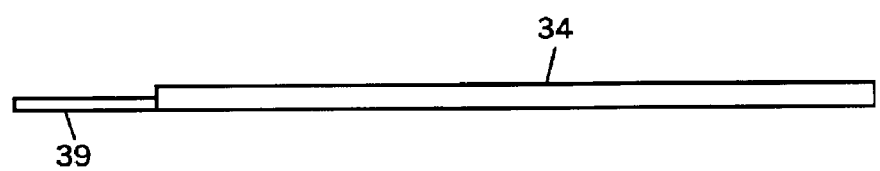
FIGS. 6A and 6B are views showing an example of keys displayed on an input sheet of FIG. 3.
Figure 6B:
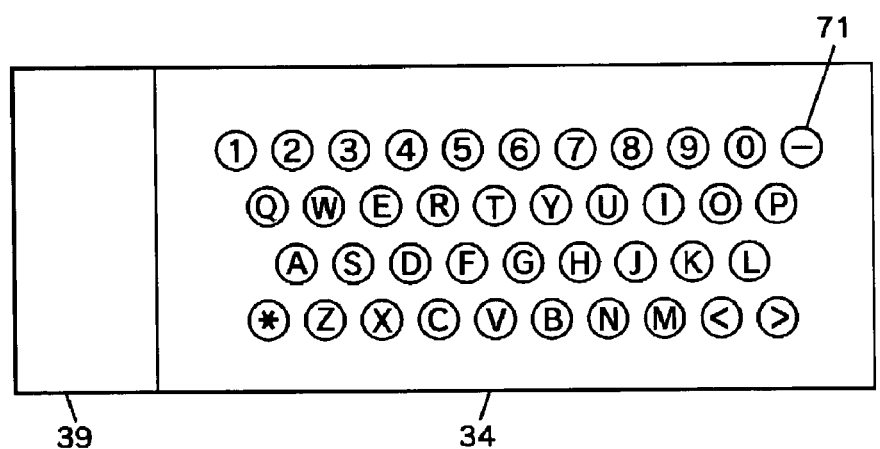

FIG. 6A is a side elevational view of the input sheet 34. FIG. 6B shows a front elevational view of the input sheet 34; and keys 71 representing alphabetical characters and numerical characters are displayed on the front surface of the input sheet 34. The keys 71 may represent Japanese "hirakana" characters, in addition to the above characters.

Figure 7:
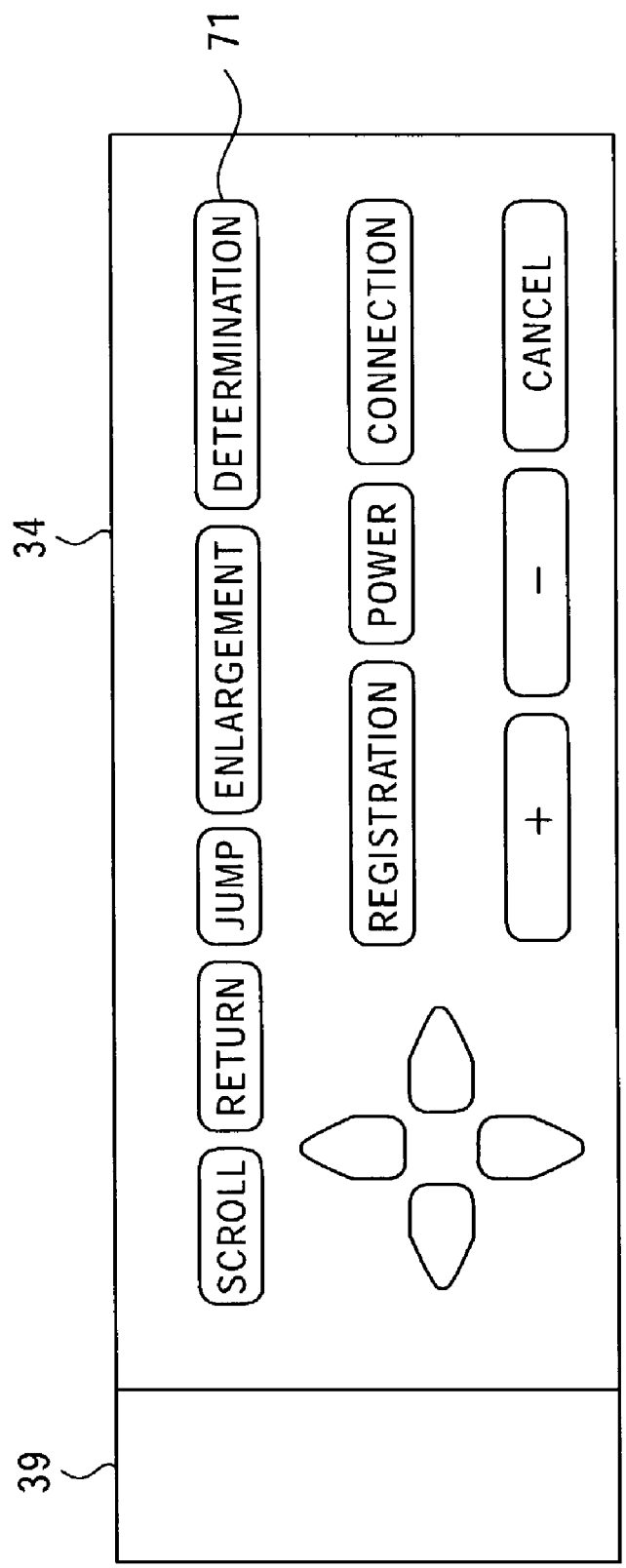
FIG. 7 is a view showing another example displayed on the input sheet of FIG. 3.

Further, as shown in FIG. 7, the keys 71 of the input sheet 34 may be arranged as keys having the functions of, for example, scroll, return, cursor, and the like. These keys 71 on the input sheet 34 can be displayed by print or engraving (emboss) processing.

Next, an arrangement of the keys 71 on the input sheet 34 will be described in more detail.

Figure 8A:
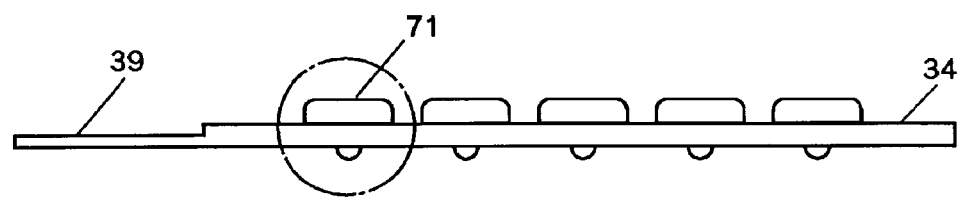
FIGS. 8A to 8C are views showing a detailed structure of the keys in FIGS. 6A, 6B, and 7.
Figure 8B:
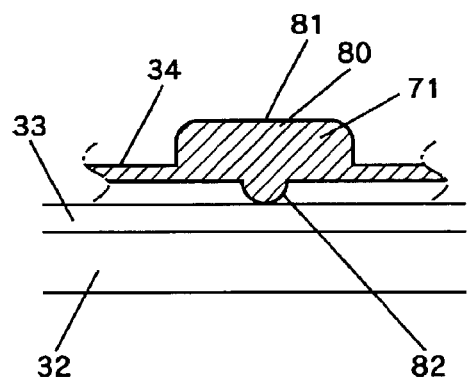
Figure 8C:
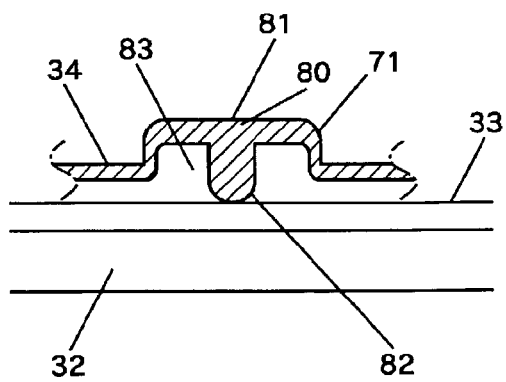

FIGS. 8A to 8C show an example in which the keys 71 are formed by the engraving processing. FIG. 8B shows a sectional arrangement of a key 71 of FIG. 8A in enlargement. In this arrangement, the key 71 is formed as a button 80 having a sufficient thickness. A character and a figure representing the type of the key 71 is formed on the top portion 81 of the button 80 as an uppermost portion thereof by print or engraving. When pressure is applied to the top portion 81, the button 80 is elastically deformed and a projection 82 at the lower portion of the button 80 is pressed downward. With this operation, pressure is applied to the input device 33, and, for example, the resistance value of the resistance film of the input device 33 is changed, and thereby an input coordinate is detected. The user can get a feeling of stroke or a feeling of click through the elastic deformation of the button 80.

FIG. 8C shows a modified example of the button 80 shown in FIG. 8B. In this example, a recessed portion 83 acting as a void space is formed around the projection 82. With this arrangement, the button 80 can be elastically deformed more easily. Thus, the user can get a lighter feeling of stroke and a lighter feeling of click, and thereby the operability is improved. Since an operation is executed on the input sheet 34, the input device 33 is not made dirty even if the input sheet 34 is touched with a finger, which prevents an image displayed on the display unit 32 from being invisible, and thus a pen can be omitted. Accordingly, the cost of the PDA can be reduced and the operability thereof can be improved. Further, since the user can see the image displayed on the display unit 32 by disposing the input sheet 34 at the second position, it is possible to get the feeling of stroke and the feeling of click by increasing the thickness of the input sheet 34 without making a screen dark and without making it difficult to see a displayed image.

The input sheet 34 may entirely cover the display unit 32 (input device 33) at the first position. However, when the input sheet 34 is arranged to cover only a part of the display unit 32 (input device 33), an image displayed on the not-covered portion thereof can be presented to the user more clearly. Further, since the input sheet 34 is composed of a sheet-shaped member, it can be easily moved (turned) between the first position and the second position by making use of the elastic force of the member, which suppresses an increase in the size of the PDA.

Figure 9:
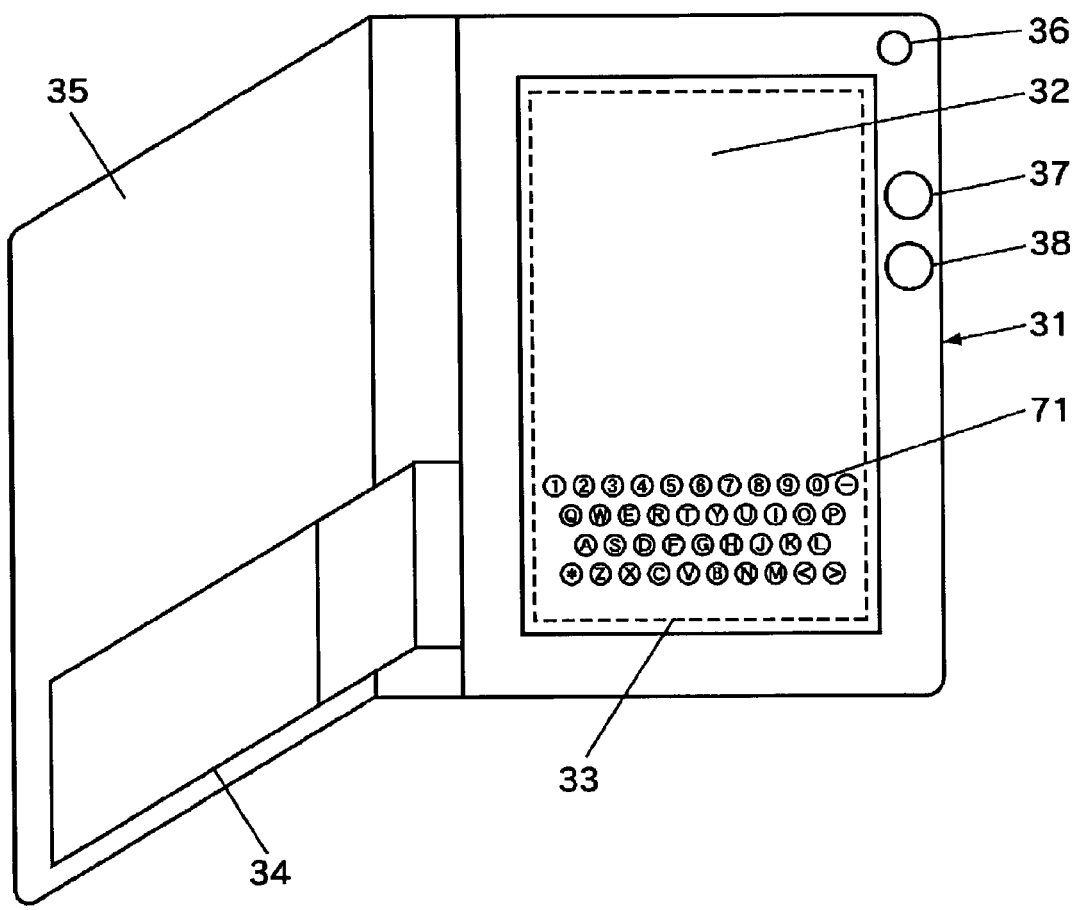
FIG. 9 is a perspective view showing an example of another arrangement of the PDA to which the present invention is applied.

The keys 71 are formed on the input sheet 34 in the above arrangement. However, the characters and figures representing the types of the keys may be directly displayed on the display unit 32, as shown in FIGS. 9 and 10, and only mechanisms acting as the buttons 80, as shown in FIG. 8B or FIG. 8C, may be formed on the upper surface of the input sheet 34 without displaying characters, figures, and the like on the upper surface of the input sheet 34 by print or engraving.

Accordingly, more functions can be allocated to the keys, as compared with the mechanisms shown in FIGS. 6 and 7, by changing the displays of the keys of the display unit 32 as necessary while maintaining the feeling of stroke and the feeling of click as they are.

Figure 11A:
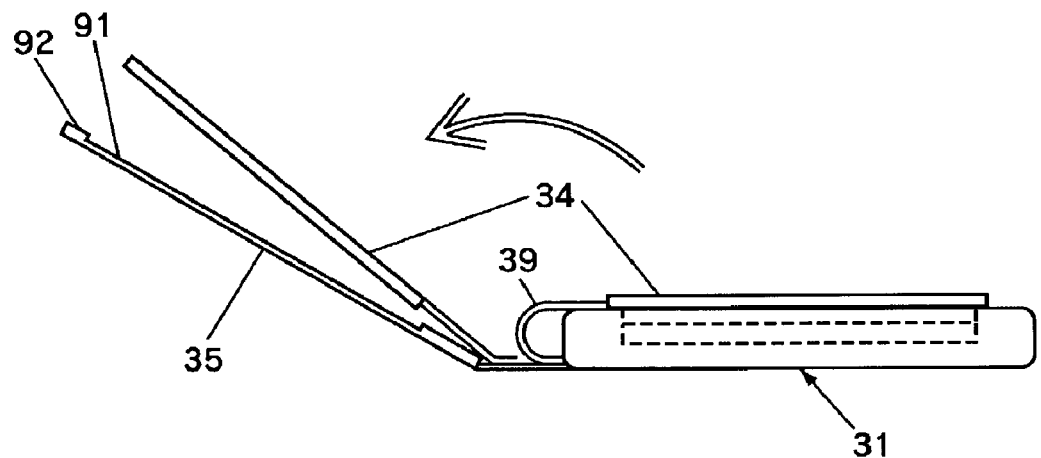
FIGS. 11A and 11B are views showing an arrangement of a lid member of FIG. 3.
Figure 11B:
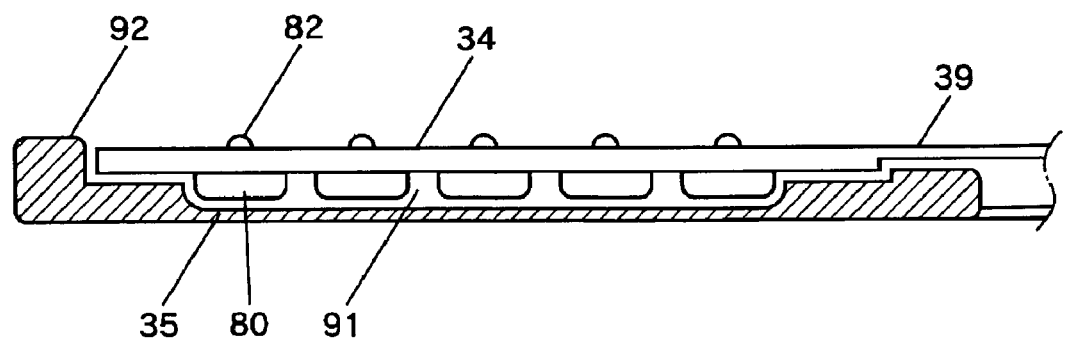

FIGS. 11A and 11B are views showing an example of an arrangement for preventing a wrong operation when the input sheet 34 is not used (when it is located at the second position). In this example, an accommodating portion 91 is formed on the surface of the lid member 35 confronting the input sheet 34. The accommodating portion 91 forms a space for accommodating the buttons 80 on the upper surface of the input sheet 34. Further, the extreme end 92 of the lid member 35 is formed such that it is located at a position higher than the projections 82 in FIG. 11B (extends therefrom) when the input sheet 34 is accommodated in the accommodating portion 91. Accordingly, even if the lid member 35, in which the input sheet 34 is accommodated, is closed so as to cover the display unit 32 of the main body 31, the projections 82 do not press the input device 33 strongly. Thus, the wrong operation can be suppressed even if pressure is applied to the lid member 35 from the upper side thereof.

Figure 10:
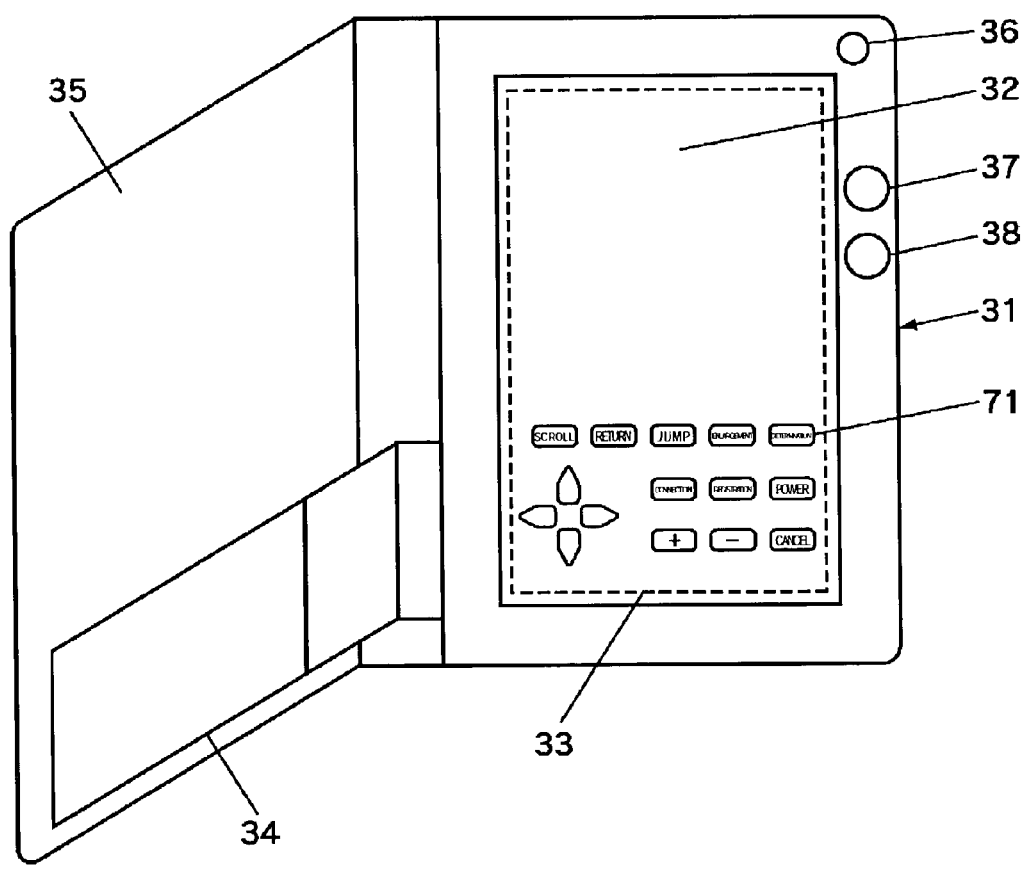
FIG. 10 is a perspective view showing an example of still another arrangement of the PDA to which the present invention is applied.

While it is not always necessary that the input sheet 34 be transparent or semi-transparent in the examples shown in FIGS. 6A, 6B, and 7, the input sheet 34 must be transparent or semi-transparent in the examples shown in FIGS. 10, 11A, and 11B.

Next, an example for detecting if the input sheet 34 is located at the first position will be described.

Figure 12A:
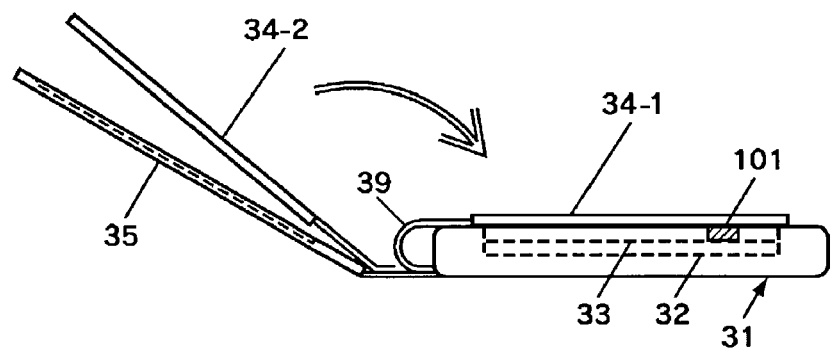
FIGS. 12A and 12B are views showing an example of a further arrangement of the PDA to which the present invention is applied.
Figure 12B:
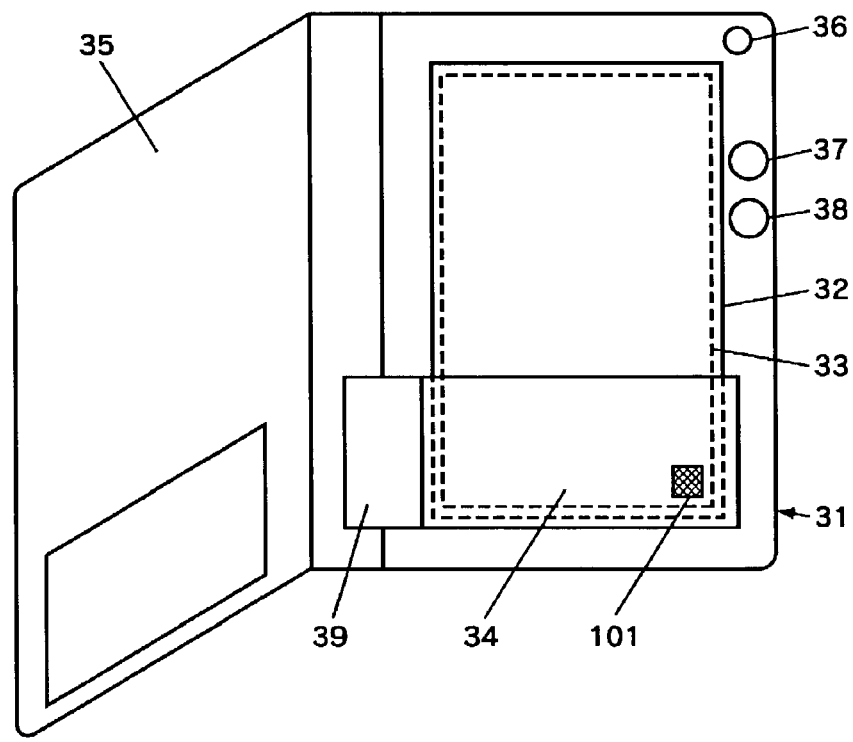

In this example, as shown in FIGS. 12A and 12B, when the user presses a predetermined position (position corresponding to a detecting portion 101) that is preset on the input sheet 34 located on the input device 33 at the time the input sheet 34 is moved from the second position (not-used state) 34-2 to the first position (used position) 34-1, the pressure applied thereto is detected by the detecting portion 101 of the input device 33 by, for example, the change of the resistance value of the predetermined position. After the pressure is detected, the user can input information using the buttons of the input sheet 34.

Figure 13:
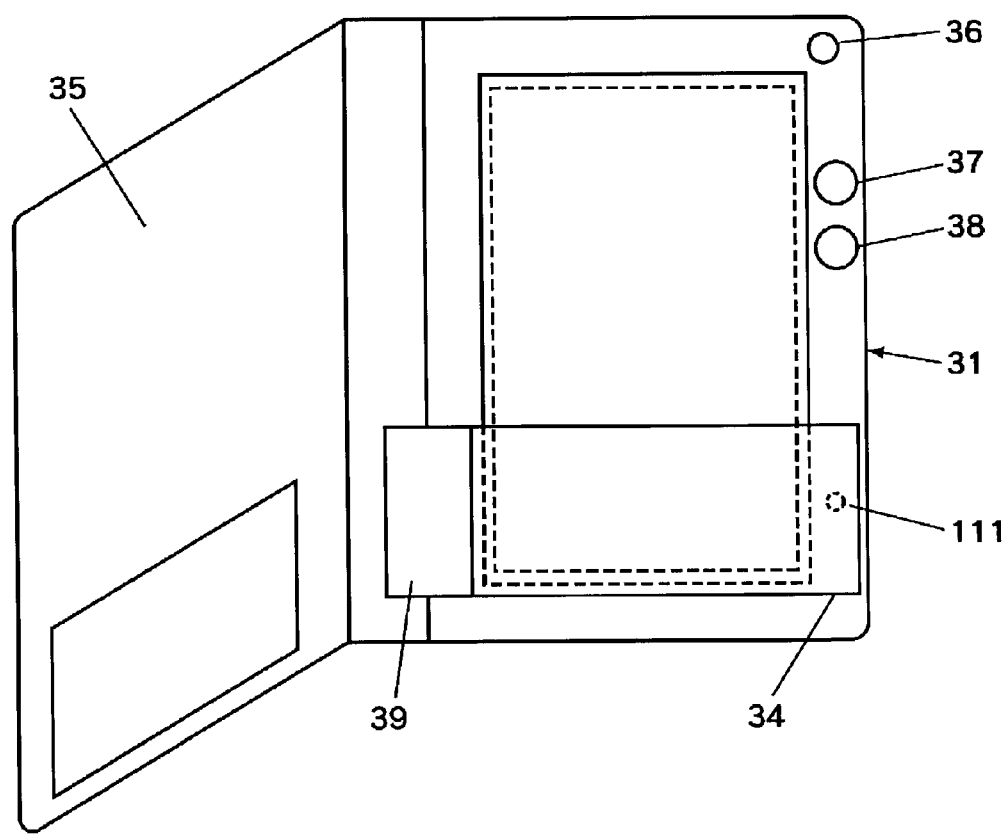
FIG. 13 is a perspective view showing an example of a still further arrangement of the PDA to which the present invention is applied.
Figure 14A:
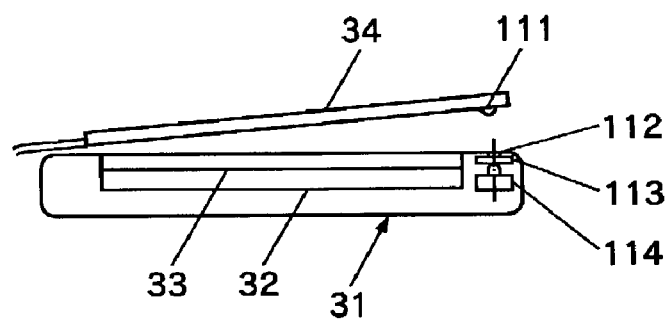
FIGS. 14A and 14B are views showing the example of the still further arrangement of the PDA to which the present invention is applied.
Figure 14B:
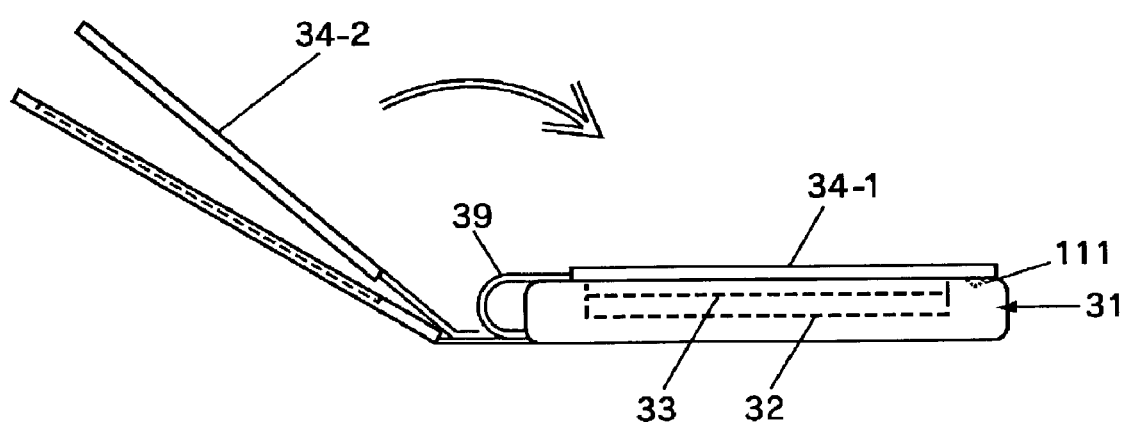

In the example shown in FIGS. 13, 14A, and 14B, a projection 111 is disposed on the back surface of the input sheet 34 (surface confronting the display unit 32) in the region thereof confronting the region of the main body 31 outside the display unit 32 (input device 33). Further, a hole 112 is formed on the main body 31 outside the display unit 32 (input device 33) at the position thereof confronting the projection 111. A switch 114 is disposed in the hole 112 of the main body 31 through a rubber sheet 113. Accordingly, as shown in FIG. 14B, when the input sheet 34 is moved from the second position (not-used state) 34-2 to the first position (used position) 34-1, the projection 111 is inserted into the hole 112 and presses the switch 114 through the rubber sheet 113. With this operation, it is detected that the input sheet 34 is located at the first position, and thereafter information can be input using the buttons of the input sheet 34.

In this example, the position of the input sheet 34 can be detected without a special operation as in the example of FIGS. 12A and 12B.

Figure 15:
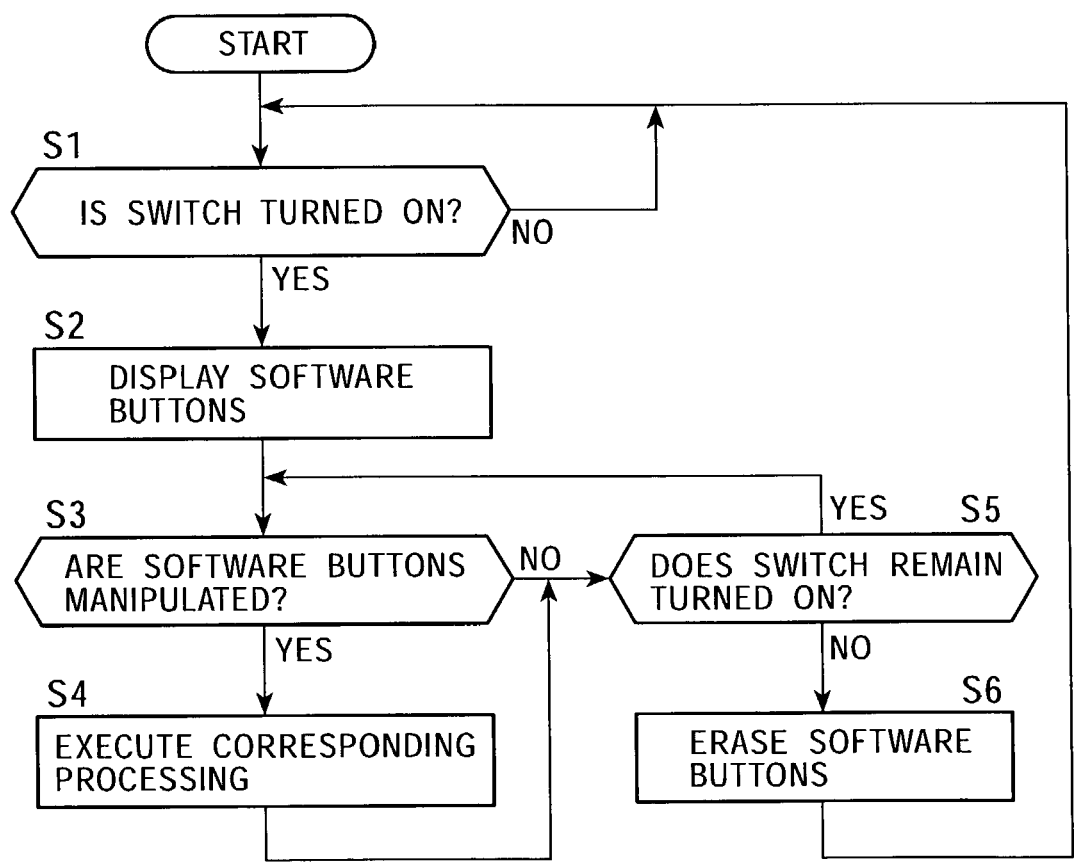
FIG. 15 is a flowchart explaining the processing executed in the example shown in FIGS. 13 and 14.
Figure 16:
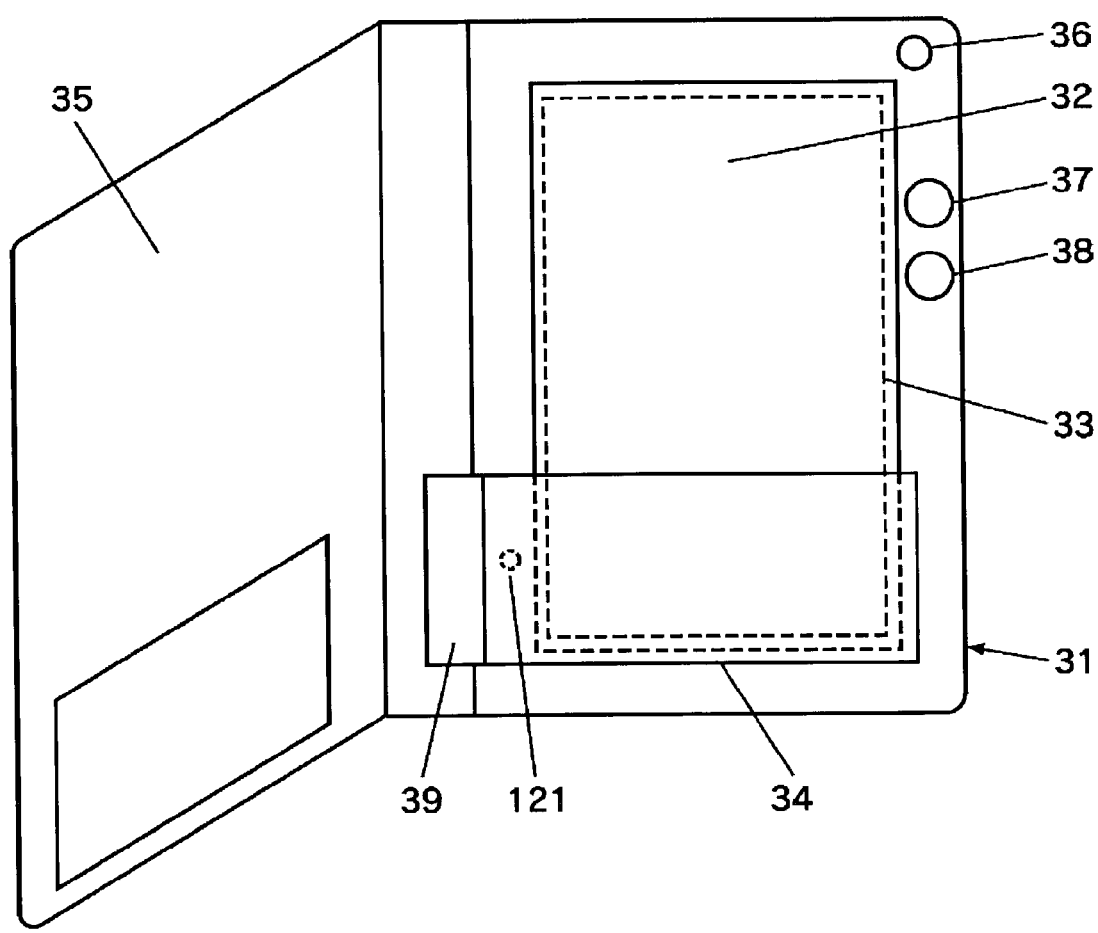
FIG. 16 is a view showing an example of another arrangement of the PDA to which the present invention is applied.
Figure 17A:
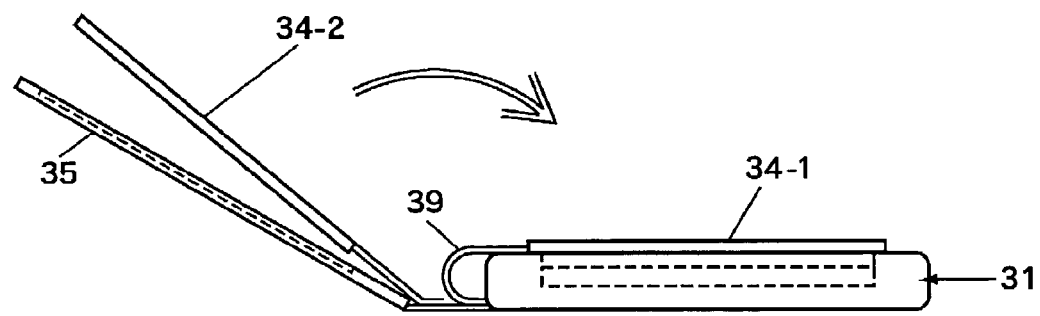
FIGS. 17A to 17C are views showing the example of the other arrangement of the PDA to which the present invention is applied.
Figure 17B:
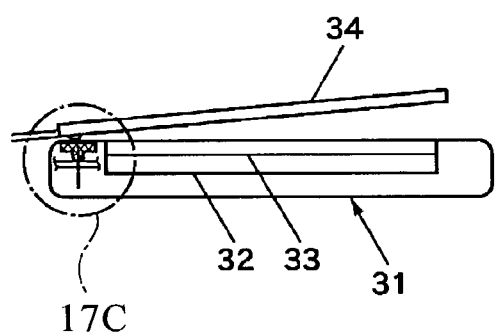
Figure 17C:
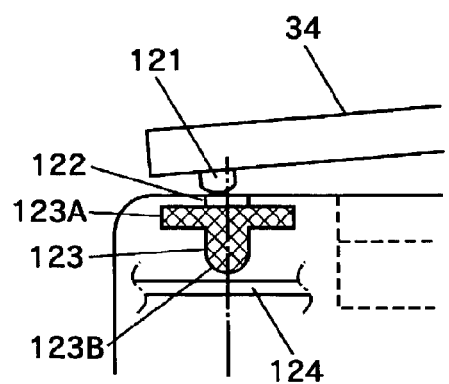

FIG. 15 is a flowchart showing input processing executed in the examples shown in FIGS. 9, 10, 13, 14A, and 14B.

A CPU 51 determines at step S1 whether or not the switch 114 is turned on by the movement of the input sheet 34. When the switch 114 is not turned on, the CPU 51 waits until the switch 114 is turned on. When it is determined that the switch 114 is turned on, the CPU 51 controls the display unit 32 at step S2 and displays software buttons, thereby the characters and figures representing the types of the keys 71 as shown in, for example, FIG. 9 or FIG. 10 are displayed on the display unit 32. In other words, since the characters and figures corresponding to the keys 71 are not displayed as long as the input sheet 34 is not disposed at the first position, the user cannot substantially input data. Further, even if the user inputs data, the CPU 51 does not substantially accept the input data.

At step S3, the CPU 51 determines whether or not the software buttons are operated, and when it is determined that the software buttons are not operated, the process goes to step S5.

At step S5, the CPU 51 determines whether or not the switch 114 remains turned on, and when it is determined that the switch 114 remains turned on, the process returns to step S3. When it is determined at step S5 that the switch 114 does not remain turned on (is turned off), the process goes to step S6, at which step the CPU 51 erases the software buttons. Thereafter, the process returns to step S1 and processing is repeated at step S1 and subsequent steps.

In the example of FIGS. 13, 14A, and 14B, the projection 111 is formed at a position far from the fulcrum of turn (joint 39) of the input sheet 34. As shown in FIGS. 16 and 17A to 17C, however, the projection 111 may be formed to a side near to the fulcrum of turn (joint 39) of the input sheet 34, and a projection 121 may be formed on the back surface (surface confronting the display unit 32).

In this example, a hole 122 is disposed outward of the display unit 32 on the fulcrum of turn side thereof at the position thereof confronting the projection 121 when the input sheet 34 is disposed at the first position. A member 123, which is composed of electric conductive rubber and in which, for example, a sheet 123A is formed integrally with a projection 123B, is disposed under the hole 122. The member 123 is elastically deformed when it is pressed by the projection 121, and it comes into contact with a pattern (not shown) disposed on a substrate 124 and makes the pattern conductive. With this operation, the position of the input sheet 34 is detected.

While the input device 33 is disposed on the upper surface of the display unit 32 in the above examples, the input device 33 may be omitted.

Figure 18:
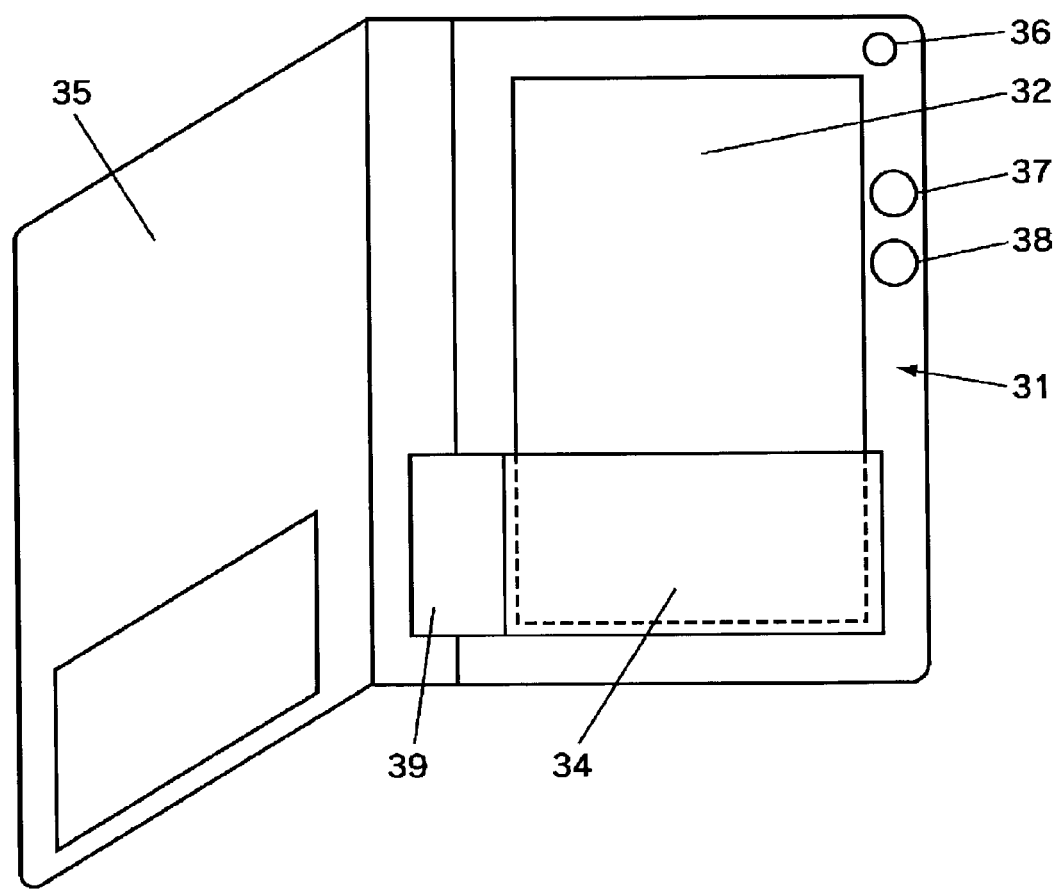
FIG. 18 is a perspective view showing an example of an arrangement of another PDA to which the present invention is applied.
Figure 19A:
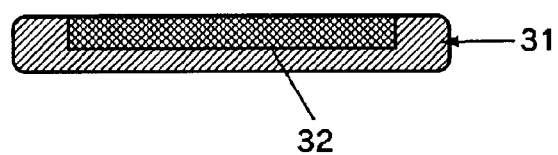
FIGS. 19A and 19B are views showing the example of the arrangement of the other PDA to which the present invention is applied.
Figure 19B:
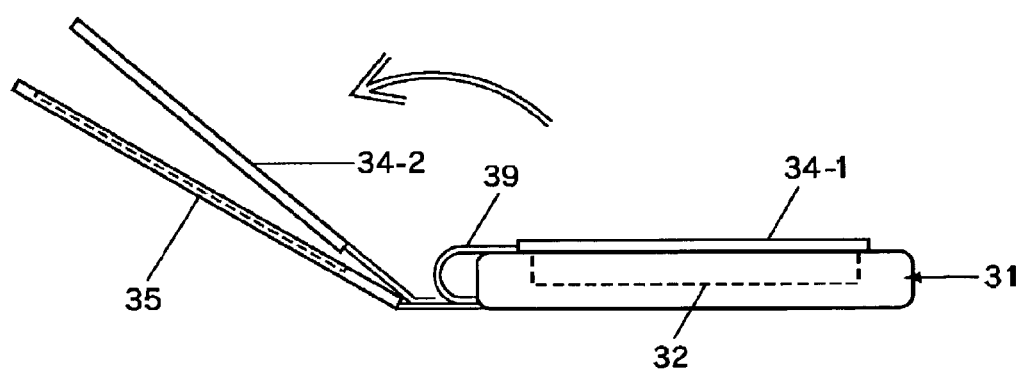

FIGS. 18 to 20 show an example of an arrangement of another PDA in this case. In this example, an input device 33 is not mounted on the main body 31. Thus, in the example, an input sheet 34 is directly disposed on a display unit 32, as shown in FIGS. 18 and 19B.

In this example, an input operation is detected by the input sheet 34. Accordingly, the input sheet 34 is arranged as shown in FIGS. 20A and 20B.

Figure 20A:
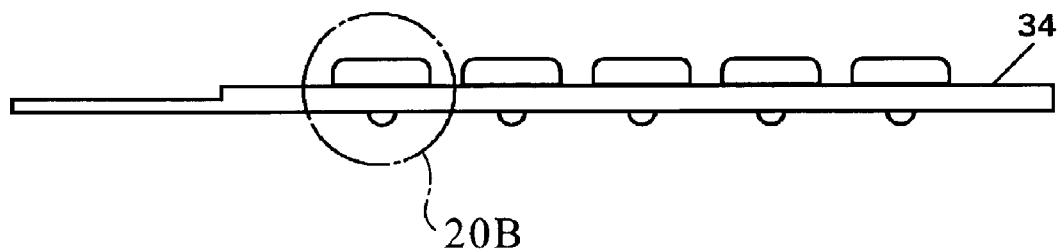
FIGS. 20A and 20B are views showing a detailed arrangement of an input sheet in FIG. 18.
Figure 20B:
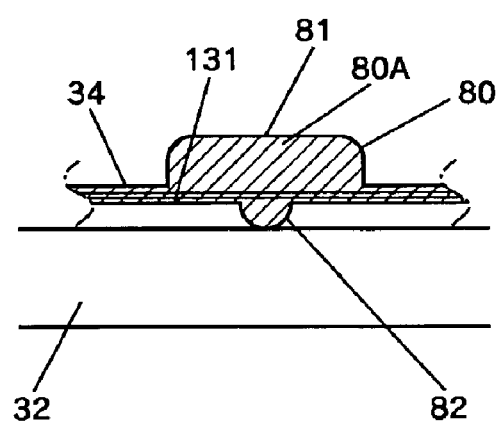

As shown in FIG. 20A, the input sheet 34 is arranged such that a resistance film 131 is interposed between the projections 82 of buttons 80 and the main bodies 80A thereof. That is, the input sheet 34 has the resistance film 131 in the interior thereof. Therefore, when pressure is applied to the input sheet 34 with a hand or a pen, the resistance value of the portion of the input sheet 34 to which the pressure is applied is changed, from which an operating position is detected.

FIGS. 21 to 24 show examples in which a lid member 35 is not disposed to a main body 31.

Figure 21A:
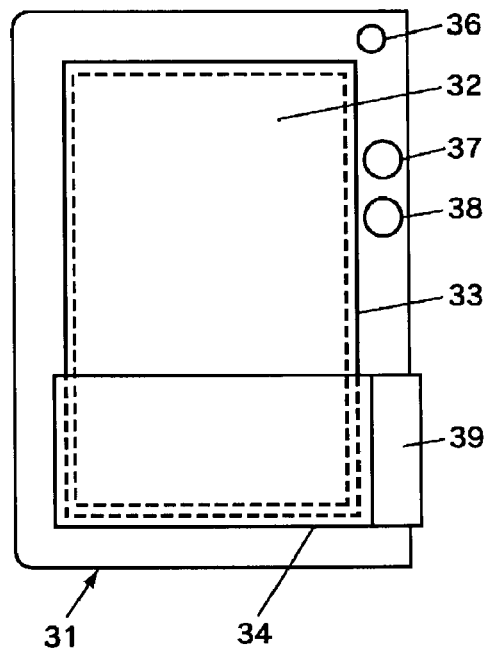
FIGS. 21A to 21C are views showing an example of another arrangement of the PDA to which the present invention is applied.
Figure 21B:
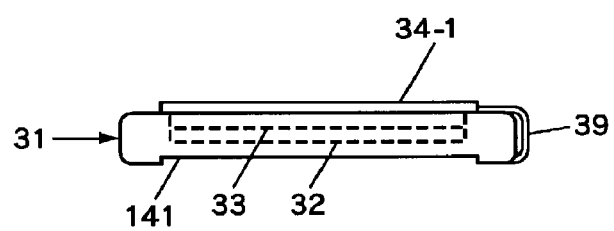
Figure 21C:
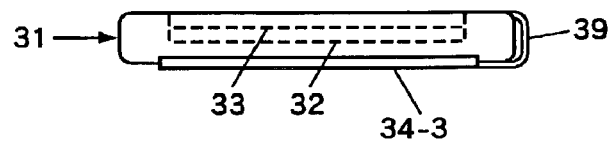

In the example shown in FIGS. 21A to 21C, a recessed portion 141 having a shape approximately corresponding to that of an input sheet 34 is formed on the back surface of a main body 31 (on the surface opposite to a display unit 32). The input sheet 34 can be turned between a first position (used position) 34-1 and a second position (not-used state) 34-2 about a joint 39 acting as a fulcrum. The input sheet 34 is accommodated in the recessed portion 141 at the second position.

Figure 22A:
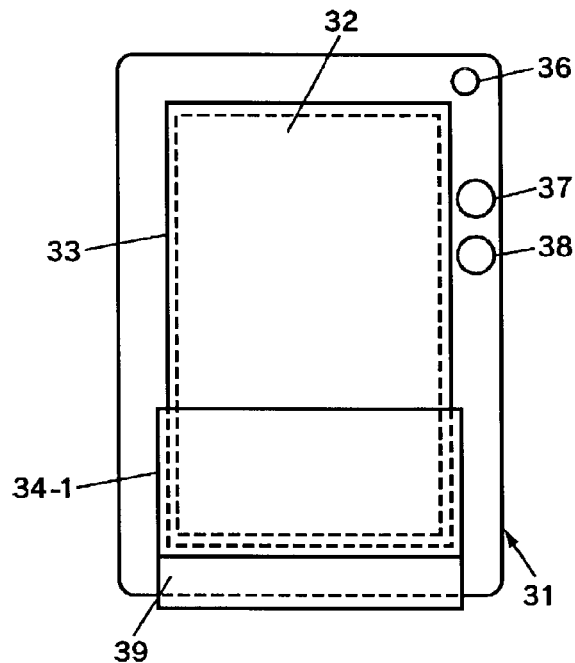
FIGS. 22A to 22C are views showing an example of another arrangement of the PDA to which the present invention is applied.
Figure 22B:
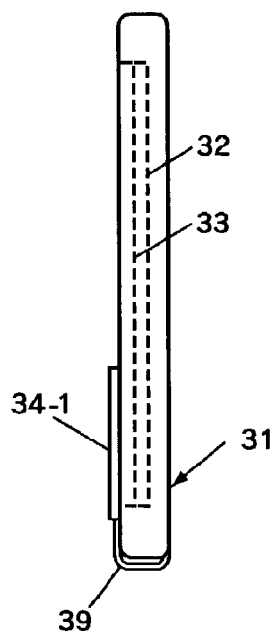
Figure 22C:
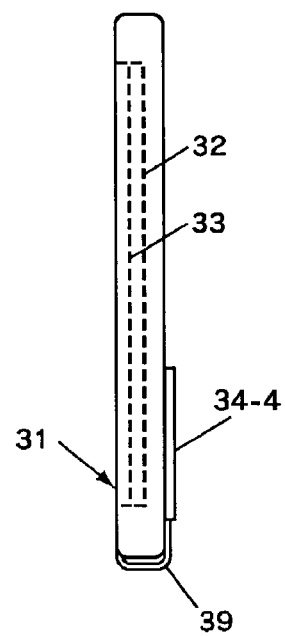
Figure 23A:
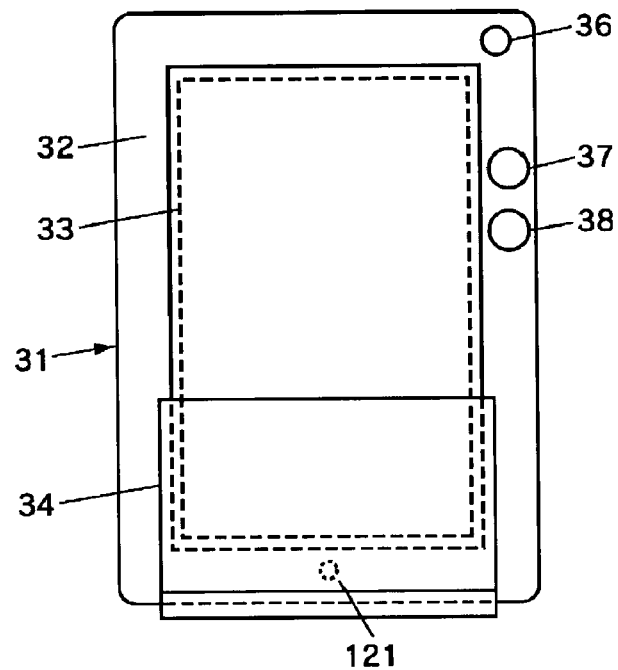
FIGS. 23A and 23B are views showing an example of another arrangement of the PDA to which the present invention is applied.
Figure 23B:
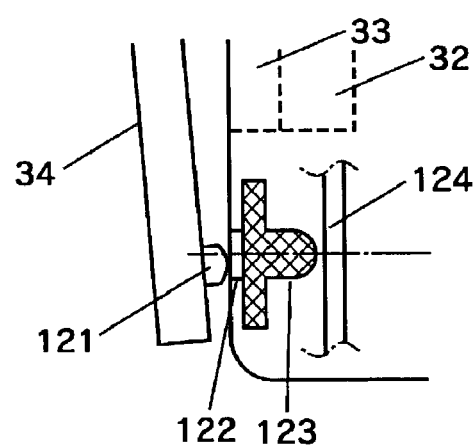
Figure 24A:
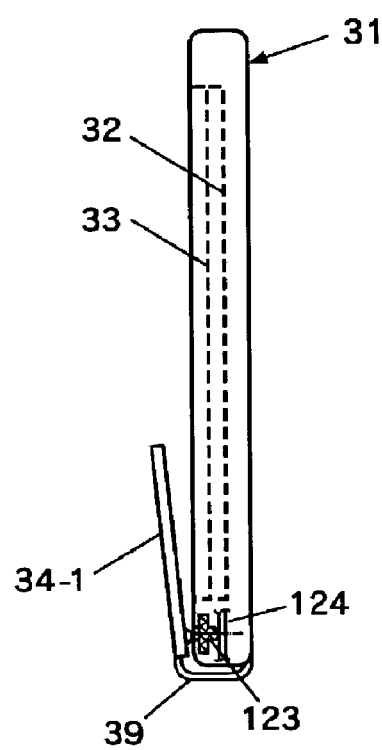
FIGS. 24A and 24B are views showing the example of the other arrangement of the PDA to which the present invention is applied.
Figure 24B:
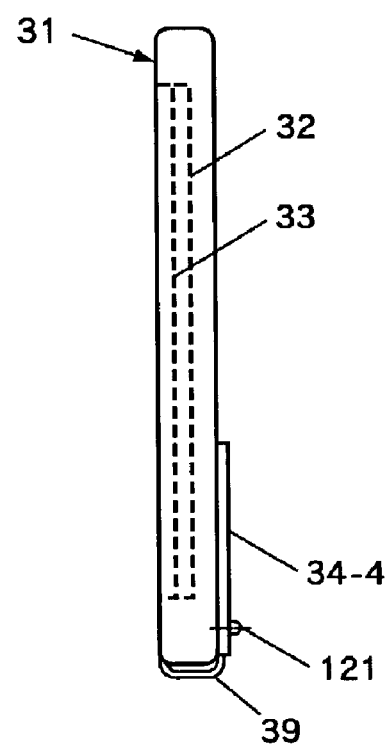

In the example of FIGS. 21A to 21C, the input sheet 34 can be turned in a transverse direction (horizontal direction in FIGS. 21A to 21C). In the example of FIGS. 22A to 22C, however, an input sheet 34 can be turned in a vertical direction (up/down direction in FIGS. 22A to 22C) between the front surface and the back surface of a main body 31.

FIGS. 23A, 23B, 24A, and 24B show an example in which the example of FIGS. 16 and 17A to 17C is applied to the example of FIG. 22. In this example, when an input sheet 34 is turned vertically from a second position 34-3 to a first position 34-1, a projection 121 causes a member 123 composed of the electrically conductive rubber to come into contact with a substrate 124, so that a pattern on the substrate 124 is made conductive.

As described above, according to the information processing apparatus of the present invention, since an operation executed when an predetermined input is performed is detected by the sheet-shaped member movable between the first position where at least a part of information being displayed is covered and the second position where the information being displayed is not covered, the operability of the apparatus can be improved while clearly displaying the information. Accordingly, inconvenience of the user can be eliminated.

What is claimed is:

1. An information processing apparatus, comprising:
   a display unit adapted to display predetermined information; and
   an input sheet moveable between a first position and a second position, said input sheet including a projection, a button, and a resistance film,
   wherein said projection protrudes from a first surface of said input sheet, said projection in said first position being adapted to contact said display unit,
   wherein said button protrudes from a second surface of said input sheet, and
   wherein said resistance film is between said projection and said button, said resistance film being adapted to detect pressure applied to said button.

2. An information processing apparatus according to claim 1, wherein said pressure changes a resistance value of a portion of said input sheet to which said pressure is applied.

3. An information processing apparatus according to claim 1, wherein said input sheet in said first position covers at least a part of said display unit.

4. An information processing apparatus according to claim 1, wherein said input sheet in said second position does not cover said display unit.

5. An information processing apparatus according to claim 1, wherein a character is uniquely associated with said projection.

6. An information processing apparatus according to claim 1, wherein another projection protrudes from said second surface of said input sheet.

7. An information processing apparatus according to claim 1, further comprising:
a lid member disposed turnably with respect to a main body between said first position and said second position.

8. An information processing apparatus according to claim 1, wherein said display unit is a liquid crystal device or an electroluminescence device.

9. An information processing apparatus according to claim 1, wherein said input sheet is transparent or semi-transparent.

10. An information processing apparatus according to claim 1, wherein said input sheet comprises a polymeric material.

11. An information processing apparatus according to claim 1, further comprising:
a lid member disposed turnably with respect to a main body between said first position and said second position,
wherein said projection and another projection protrude from a first surface of said input sheet, and
wherein, with said input sheet in said first position, a switch within said main body is actuated to detect other pressure applied by said another projection.

12. An information processing apparatus according to claim 11, wherein an accommodating portion is formed on the surface of said lid member, said accommodating portion forming a space for accommodating said button.

13. An information processing apparatus according to claim 11, wherein a joint is between said input sheet and said main body.

14. An information processing apparatus according to claim 11, wherein said joint is composed of the same material as that of said input sheet.

15. An information processing apparatus according to claim 11, wherein said joint is composed of a different material than that of said input sheet.

16. An information processing apparatus according to claim 11, wherein said pressure changes a resistance value of a portion of said input sheet to which said pressure is applied.

17. An information processing apparatus according to claim 11, wherein said input sheet in said first position covers at least a part of said display unit.

18. An information processing apparatus according to claim 11, wherein said input sheet in said second position does not cover said display unit.

19. An information processing apparatus according to claim 11, wherein a character is uniquely associated with said projection.

20. An information processing apparatus according to claim 11, wherein said display unit is a liquid crystal device or an electroluminescence device.

21. An information processing apparatus according to claim 11, wherein said input sheet is transparent or semi-transparent.

22. An information processing apparatus according to claim 11, wherein said input sheet comprises a polymeric material.

* * * * *